Nov. 24, 1959    C. LUNDAHL ET AL    2,914,654
METHOD FOR JOINING ELECTRODES
Filed Aug. 26, 1957
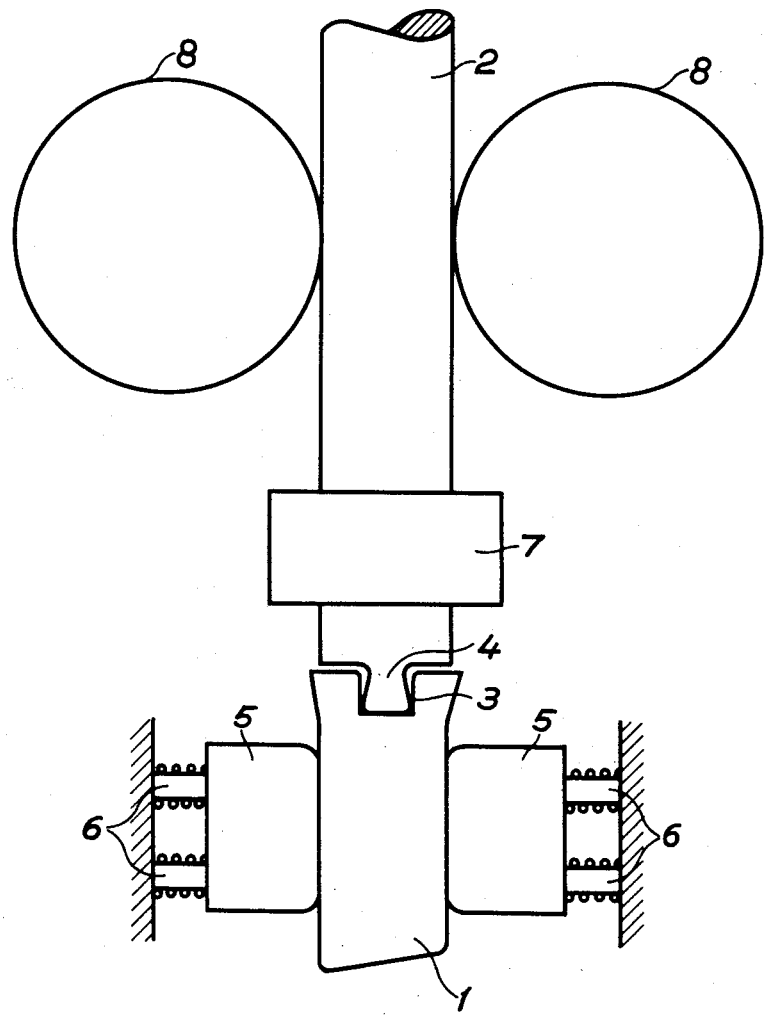
INVENTORS
Carl Lundahl and
BY Sven Lundahl.
Attorney.

2,914,654
Patented Nov. 24, 1959

2,914,654
METHOD FOR JOINING ELECTRODES

Carl Lundahl and Sven Lundahl, Malmo, Sweden, assignors to Allmanna Svenska Elektriska Aktiebolaget, a Swedish corporation Application August 26, 1957, Serial No. 680,329

Claims priority, application Sweden September 7, 1956

3 Claims. (Cl. 219—136)

In electrical submerged arc welding, electrodes with comparatively small diameters are used almost exclusively, because it is desirable to avoid interruptions due to change of electrodes. At small diameters it is possible to use wires with a greater length rolled together in rings. But it is not possible, when using larger diameters, to obtain an even and reliable feeding of the welding wire coming from wire rings. This depends on the difficulty in straightening the wire when it has left the feeding device. A very slight angular deviation of the wire can cause the weld to be deposited at the side of the welding joint. The effect is of course more considerable if the diameter of the wire is larger.

Due to the above described circumstances it has been necessary to have in practical use only wires with small diameters. But many disadvantages are combined with the use of such wires. The welding speed, for instance, cannot be increased considerably because the weak wire cannot be loaded with too high currents. Especially in welding thick sheets there has also been obtained too wide a melting bath due to the fact that the diameter of the electrode did not correspond to the actual thickness of the sheet. Many proposals for solutions have been made, but it has been proved in practice that the only possibility of obtaining, on an industrial scale, joints with a width of the melting bath corresponding to the thickness of the welded sheet, is to use coated electrodes.

The present invention refers to a method for joining straight rod-formed electrodes for electrical submerged arc welding which makes it possible to obtain an even, continuous feeding of electrodes with diameters which are thicker than those hitherto used. The invention is chiefly characterized in that the rod-formed electrodes have an oval or elongated cross-section and are so formed that their lower end surfaces form tongues, while their upper end surfaces form slots in which these tongues fit.

The invention will be more closely described with reference to the accompanying drawing, where 1 designates the electrode to be melted. 2 designates the following electrode. The upper end surface of the electrode 1 is so formed that a slot 3 is obtained in the center of the electrode, which slot is limited by two tongues. The lower end surface of the electrode 2 is so formed that its center part forms a tongue, the width of which at its base is somewhat smaller than at the lower extremity. The electrode 2 is moved forwards by the feeding rolls 8, by which action the electrode 1 will also be actuated in downward direction. The welding current is transferred via the slide contact device 7, the contact surface of which is preferably made of copper or some copper alloy. After its passage through the contact device 7 the electrode passes between welding jaws 6 arranged at the sides, which are also preferably made of a good conducting material. The jaws 6 are pressed together by springs or some other suitable arrangement.

The rod-formed electrodes are suitably stored in a magazine, not shown on the drawing, from which they are so fed that no interruption of the continuity occurs, and the tongues 4 will fit into the slots 3. The tongues and the slots, respectively, can preferably be formed by punching or cutting. Then the remaining portions of the electrode surrounding the slot 3 will be slightly bent outwards, as seen from the center line of the electrode. The driving rolls 8 are forced against the electrode situated between them with a pressure sufficient to produce the friction power necessary for the feeding. This pressure will also cause a certain deformation of the parts surrounding the slot 3, so that the slot 3 and the tongue 4 will fit better. With continued feeding the electrodes will take up the position indicated in the drawing. Then the whole welding current will flow through the joint between the electrodes. Due to the relatively high contact resistance in this joint, a heat development occurs that partly causes a certain welding together of the material and partly a permanent deformation of the projecting parts of the upper end of the electrode 1 at the passage of this end between the side welding jaws 5. The joining method will thus be something between arc welding, resistance welding and a mechanical blocking.

The side pressure jaws 5 must have a certain length dependent on the dimensions of the wire and the welding currents used. The length must then be so dimensioned that the welding joint has time to cool at the passage. The cooling can be obtained partly by the fact that the jaws consisting of copper or a copper alloy conduct the heat better than the surrounding air, and partly because the greater part of the welding current will flow past the joint through the jaws.

With a method according to the invention one of the conditions is, as mentioned before, that the electrode used has an oval or elongated cross-section, i.e. such a form that it can be given a definite orientation in the space. Such a form also means that the current transfer is facilitated because the flat surface forced against the contact surface will be relatively large.

We claim as our invention:

1. In electric submerged arc welding, a method of joining the ends of straight electrode rods each having an elongated cross-sectional form, which comprises feeding each electrode downwardly in a lengthwise direction, causing a tongue on the one end of each electrode to enter a corresponding slot formed between two parallel tongues on the opposite end of another electrode and pressing the said parallel tongues closely upon the tongue on the one electrode, so that in turn the leading end of each electrode is secured to the trailing end of the preceding electrode.

2. In electric submerged arc welding, electrode means comprising straight electrodes, a tongue shaped member extending from one end of each electrode, a slot formed in the opposite end of each electrode, and means for feeding the electrodes in turn in alignment with each other to cause the tongue member on one electrode to enter the slot in a next adjacent electrode and means for closing the internal walls of the said slot upon the side surfaces of the said tongue shaped member so that the leading end of each electrode is thus connected with the trailing end of the preceding electrode.

3. Electrode means according to claim 2 in which the said straight electrodes each have an elongated cross-sectional form and the said slot and tongue are disposed in parallel relation to the greater dimension of the cross section of the electrodes.

References Cited in the file of this patent

UNITED STATES PATENTS

| | | |
|---|---|---|
| 999,267 | Slick | Aug. 1, 1911 |
| 1,106,860 | Bayton | Aug. 11, 1914 |
| 1,512,786 | Morton | Oct. 21, 1924 |
| 1,680,369 | Dugan | Aug. 14, 1928 |
| 2,024,455 | Galehouse | Dec. 17, 1935 |
| 2,032,240 | Westhaver | Feb. 25, 1936 |
| 2,762,118 | Shaw et al. | Sept. 11, 1956 |

FOREIGN PATENTS

| | | |
|---|---|---|
| 396,083 | Germany | May 23, 1924 |